United States Patent
Sasagawa et al.

(10) Patent No.: US 6,914,898 B2
(45) Date of Patent: Jul. 5, 2005

(54) IP COMMUNICATION NETWORK SYSTEM HAVING A GATEWAY FUNCTION WITH COMMUNICATION PROTOCOL CONVERSION BETWEEN A SWITCHED CIRCUIT NETWORK AND A PACKET SWITCHED NETWORK INCLUDING DATA OVER TCP/IP AND VOICE/FAX OVER RTP

(75) Inventors: Kazutaka Sasagawa, Tokyo (JP); Tsuyoshi Uehara, Tokyo (JP); Yasushi Takahashi, Tokyo (JP); Makoto Imahashi, Tokyo (JP)

(73) Assignees: Fujitsu Limited, Kawasaki (JP); Fujitsu I-Network Systems Limited, Tokyo (JP)

( * ) Notice: Subject to any disclaimer, the term of this patent is extended or adjusted under 35 U.S.C. 154(b) by 782 days.

(21) Appl. No.: 09/737,192

(22) Filed: Dec. 14, 2000

(65) Prior Publication Data

US 2001/0007555 A1 Jul. 12, 2001

(30) Foreign Application Priority Data

Dec. 24, 1999 (JP) .......................................... 11-367567

(51) Int. Cl.[7] .............................................. H04L 12/56
(52) U.S. Cl. ...................... 370/352; 370/401; 370/466; 370/474
(58) Field of Search ................................ 370/352, 353, 370/354, 355, 356, 401, 466, 473, 474

(56) References Cited

U.S. PATENT DOCUMENTS 5,303,344 A * 4/1994 Yokoyama et al. ......... 709/230
6,304,567 B1 * 10/2001 Rosenberg ................... 370/356
6,385,195 B2 * 5/2002 Sicher et al. ................ 370/356
6,463,051 B1 * 10/2002 Ford ........................... 370/352
6,487,196 B1 * 11/2002 Verthein et al. ............. 370/352
6,542,472 B1 * 4/2003 Onuma ....................... 370/253
6,603,757 B1 * 8/2003 Locascio .................... 370/352
6,674,761 B1 * 1/2004 Bae ............................ 370/412
6,678,246 B1 * 1/2004 Smyth ........................ 370/230
6,704,309 B1 * 3/2004 Nada et al. ................. 370/389

* cited by examiner

Primary Examiner—Min Jung
(74) Attorney, Agent, or Firm—Katten Muchin Zavis Rosenman

(57) ABSTRACT

An IP communication interface device includes first and second connecting units, and first, second and third processors. The first processor coding first media data as B-channel data inputted to the first connecting unit from a circuit switched network, decoding packet-disassembled media data into which a packet of second media data inputted to the second connecting unit from a LAN is disassembled, and transmitting the decoded media data to the first connecting unit for forwarding as the first media data to the circuit switched network. The second processor packetizing first coded media data, disassembling the packer of the second media data, and transmitting as packet-disassembled media data to the first processor. The third processor generating second media data by adding header data to the packet-assembled media data of the second processors forwarding the second media data to the LAN via the second connecting unit, removing header data, and transmitting the header-less second media data to the second processor.

18 Claims, 7 Drawing Sheets

IP COMMUNICATION NETWORK SYSTEM HAVING A GATEWAY FUNCTION WITH COMMUNICATION PROTOCOL CONVERSION BETWEEN A SWITCHED CIRCUIT NETWORK AND A PACKET SWITCHED NETWORK INCLUDING DATA OVER TCP/IP AND VOICE/FAX OVER RTP

BACKGROUND OF THE INVENTION

The present invention relates generally to a multi switched network system (IP communication network system) capable of reducing costs for equipment and operations by integrating a switched circuit network such as a telephone network with an IP (Internet Protocol) packet switched network such as the Internet or the Intranet, and more particularly to an IP communication interface device and a circuit switch for facilitating a construction of this IP communication network system.

With an advancement of a network technology as typified by broadening the band of a local area network (LAN) and an advancement of a PC technology as typified by attaining multifunctions of a personal computer (PC) and a speed-up of a CPU applied to the PC over the recent years, it is on the verge of actualization in terms of utilization that voice data are communicated at a high speed between the PCs on a plurality of LANs.

Owing to the advancements of those technologies, application software executed between the PCs on the Internet (including the Intranet as far as it is not used in a particularly limited terminology in this Specification) configured by the LANs and wide area networks (WANs) and a hardware system incorporating this package software, are rapidly put into the market. This system is known as [Internet telephony].

In the IP communication network system known as Internet telephony, an integration of the data communications with the voice communications involves the use of a VoIP (Voice over Internet Protocol) technology. This VoIP technology is that voices (audio data) are segmented into frames at an interval of a short time (on the order of, e.g., 20 sec), and transmitted and received in the form of packets by adding IP headers thereto on a network (IP network) based on a network layer protocol, i.e., Internet Protocol (IP) used on the Internet.

Further, there is promoted a development of an interface device, incorporating a gateway function for executing a communication protocol conversion between the telephone network and the Internet, for actualizing the communications between the telephone network and the Internet.

Generally, the Internet telephony can be operated at a lower cost than a speech (voice communication) on the phone through the conventional telephone network, and therefore a spread of the IP communication network system and services thereof is being accelerated.

A transmission (transfer) standard in this IP communication network system is not yet, however, established. What exists at the present is just ITU-T Recommendation H.450.2 (H.323) that defines the services within the Internet and the services in the conventional telephone network.

With diversification and a scale-up of the infrastructures for the communications, the users tend to separately use the communication infrastructure optimal to the purpose. Under such circumstances, it is necessary and indispensable to construct a more economical intra-office communication network system by taking the Internet into the intra-office communication network system and utilizing it for the data communications and the voice communications as well.

SUMMARY OF THE INVENTION

Accordingly, it is a primary object of the present invention to provide an IP communication network system, incorporating a gateway function for executing a communication protocol conversion between a telephone network (switched circuit network) and the Internet (IP packet switched network), for actualizing a variety of communications such as voice communications and data communications between the telephone network and the Internet.

It is another object of the present invention to provide an IP communication network system capable of its being easily introduced into an existing telephone network, especially an intra-office telephone network in order to actualize the variety of communications between the telephone network and the Internet.

To accomplish the above objects, according to a first aspect of the present invention, an IP communication interface device comprises first and second connecting units for making it possible to dispose between a switched circuit network and LAN connected to an IP packet switched network, a first processing unit for coding first media-corresponding data as B-channel data inputted to the first connecting unit from the switched circuit network, decoding packet-deassembled media-corresponding data into which a packet of second media-corresponding data inputted to the second connecting unit from the LAN is deassembled, and for transmitting the decoded media-corresponding data to the first connecting unit for forwarding the same data as the first media-corresponding data to the switched circuit network, a second processing unit for assembling the coded media-corresponding data coded by the first processing unit into a packet, deassembling the packet of the second media-corresponding data, and transmitting the same data as packet-deassembled media-corresponding data to the first processing unit, and a third processing unit for generating the second media-corresponding data by adding predetermined header data to the packet-assembled media-corresponding data assembled into a packet by the second processing unit, forwarding the second media-corresponding data to the LAN via the second connecting unit, removing the header data added to the second media-corresponding data inputted to the second connecting unit, and transmitting the second media-corresponding data with the header data removed to the second processing unit.

Based on this architecture, the first and second media-corresponding data may include voice data transmitted from a voice terminal having a voice communication function, facsimile data transmitted from a facsimile terminal having a facsimile communication function and data transmitted from a data terminal having a data communication function.

Further, the first and second processing units may be functionally divided corresponding to the voice data, the facsimile data and the data that correspond to the first and second media-corresponding data, and the IP communication interface device may further comprise a selecting unit for selecting the first functionally divided processing unit in accordance with a command given from the third processing unit.

The second processing unit, when the first media-corresponding data are the voice data or the facsimile data, may generate packet-assembled media-corresponding data to which an RTP for enabling a real time transport to be done is added.

The second processing unit, when the second media-corresponding data are the voice data or the facsimile data, may generate packet-deassembled media-corresponding data from which the RTP for enabling the real time transport to be done is removed.

The third processing unit, when the packet-assembled media-corresponding data generated by the second processing unit are the voice data or the facsimile data, may add a UDP header and an IP header as the header data, and, when the packet-assembled media-corresponding data are the essential data, may add a TCP header and an IP header as the header data.

The third processing unit, when the second media-corresponding data are the voice data or the facsimile data, may remove the UDP header and the IP header added as the header data, and, when the second media-corresponding data are the essential data, may remove the TCP header and the IP header added as the header data.

The third processing unit may identify a call control signal as D-channel data in accordance with a message based on a specified protocol, and may penetratingly transmit and receive the call control signal simply by adding and removing the TCP header and the IP header.

The first and second connecting units and the first, second and third processing units may be mounted in a package card.

According to a second aspect of the present invention, a circuit switch comprises a highway switch accommodating at least one of a voice terminal having a voice communication function, a facsimile terminal having a facsimile function and a data terminal having a data communication function, and including a time division multiplexing transmission path for transmitting data corresponding to media, a first connecting unit connected directly to the highway switch, a second connecting unit for accommodating a LAN line connected to an IP packet switched network, a first processing unit for coding first media-corresponding data as B-channel data inputted to the first connecting unit, decoding packet-deassembled media-corresponding data into which a packet of second media-corresponding data inputted to the second connecting unit is deassembled, and transmitting the decoded media-corresponding data to the first connecting unit in order to forward the same decoded media-corresponding data as the first media-corresponding data to the highway switch, a second processing unit for assembling the coded media-corresponding data coded by the first processing unit, deassembling the packet of the second media-corresponding data, and transmitting the second media-corresponding data as the packet-deassembled media-corresponding data to the first processing unit, and a third processing unit for generating the second media-corresponding data by adding predetermined header data to the packet-assembled media-corresponding data assembled into a packet by the second processing unit, forwarding the second media-corresponding data to the LAN via the second connecting unit, removing the header data added to the second media-corresponding data inputted to the second connecting unit, and transmitting the second media-corresponding data with the header data removed to the second processing unit.

According to a third aspect of the present invention, an IP communication network system includes a circuit switch comprising a highway switch accommodating at least one of a voice terminal having a voice communication function, a facsimile terminal having a facsimile function and a data terminal having a data communication function, and including a time division multiplexing transmission path for transmitting data corresponding to media, a first connecting unit connected directly to the highway switch, a second connecting unit for accommodating a LAN line connected to an IP packet switched network, a first processing unit for coding first media-corresponding data as B-channel data inputted to the first connecting unit, decoding packet-deassembled media-corresponding data into which a packet of second media-corresponding data inputted to the second connecting unit is deassembled, and transmitting the decoded media-corresponding data to the first connecting unit in order to forward the same decoded media-corresponding data as the first media-corresponding data to the highway switch, a second processing unit for assembling the coded media-corresponding data coded by the first processing unit, deassembling the packet of the second media-corresponding data, and transmitting the second media-corresponding data as the packet-deassembled media-corresponding data to the first processing unit, and a third processing unit for generating the second media-corresponding data by adding predetermined header data to the packet-assembled media-corresponding data assembled into a packet by the second processing unit, forwarding the second media-corresponding data to the LAN via the second connecting unit, removing the header data added to the second media-corresponding data inputted to the second connecting unit, and transmitting the second media-corresponding data with the header data removed to the second processing unit.

According to a fourth aspect of the present invention, an IP communication network system includes an IP communication interface device comprising first and second connecting units for making it possible to dispose between a switched circuit network and LAN connected to an IP packet switched network, a first processing unit for coding first media-corresponding data as B-channel data inputted to the first connecting unit from the switched circuit network, decoding packet-deassembled media-corresponding data into which a packet of second media-corresponding data inputted to the second connecting unit from the LAN is deassembled, and for transmitting the decoded media-corresponding data to the first connecting unit for forwarding the same data as the first media-corresponding data to the switched circuit network, a second processing unit for assembling the coded media-corresponding data coded by the first processing unit into a packet, deassembling the packet of the second media-corresponding data, and transmitting the same data as packet-deassembled media-corresponding data to the first processing unit, and a third processing unit for generating the second media-corresponding data by adding predetermined header data to the packet-assembled media-corresponding data assembled into a packet by the second processing unit, forwarding the second media-corresponding data to the LAN via the second connecting unit, removing the header data added to the second media-corresponding data inputted to the second connecting unit, and transmitting the second media-corresponding data with the header data removed to the second processing unit.

According to the present invention, it is feasible to provide the IP communication network system, incorporating the gateway function for executing the communication protocol conversion between the telephone network (switched circuit network) and the Internet (IP packet switched network), for actualizing the variety of communications such as the voice communications and the data communications between the telephone network and the Internet.

According to the present invention, it is also possible to provide the IP communication network system capable of its being easily introduced into the existing telephone network, especially the intra-office telephone network in order to actualize the variety of communications between the telephone network and the Internet.

As a result, according to the present invention, it is easier to construct the economical circuit switch and IP communication network system.

BRIEF DESCRIPTION OF THE DRAWINGS

These objects and advantages of the present invention will become more apparent and more readily appreciated from the following detailed description of the presently preferred exemplary embodiments, taken in conjunction with the accompanying drawings of which.

DETAILED DESCRIPTION OF THE PREFERRED EMBODIMENTS

Next, embodiments of the present invention will hereinafter be discussed with reference to the accompanying drawings.

[Architecture of IP Communication Network System]

Figure 1:
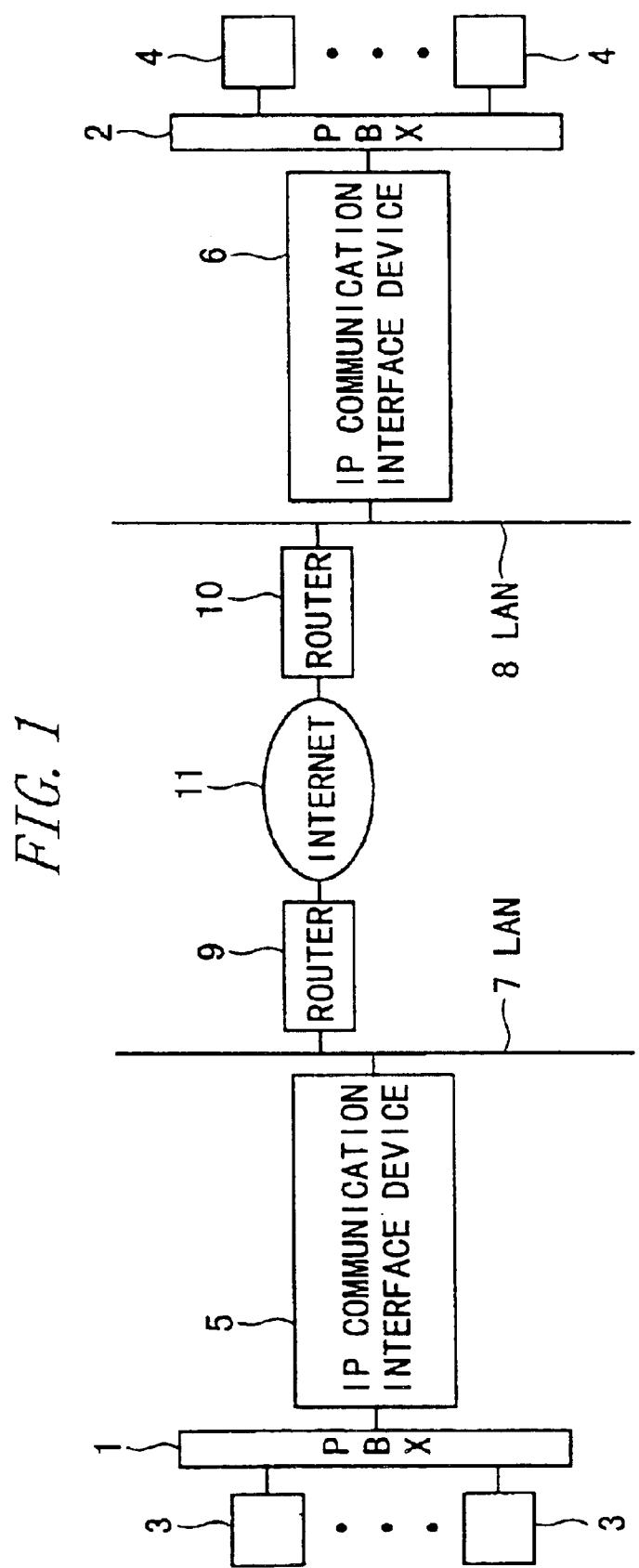
FIG. 1 is a block diagram showing an architecture of an IP communication network system in one embodiment of the present invention.

FIG. 1 shows an architecture of an IP communication network system in one embodiment of the present invention. Referring to FIG. 1, PBXs (private branch exchanges) 1, 2 configuring a telephone network as a switched circuit network respectively accommodate a plurality of terminal devices (which may be simply referred to as terminals in some cases) 3 and a plurality of terminals 4. These terminal 3, 4 are each classified as a telephone terminal incorporating a voice communication function, and a facsimile (FAX) terminal having a FAX communication function, or a data terminal such as a personal computer (PC) having a data communication function. Note that the PBXs 1, 2 may also be main devices corresponding to typical PBXs. Further, the PBXs 1, 2 are connected to an ISDN relay line to a public switched network, however, their illustrations are herein omitted.

IP communication interface devices 5, 6 serve to connect the PBXs 1, 2 to local area networks (LANs) 7, 8, respectively. The IP communication interface devices 5, 6, which will hereinafter be described in depth, can be provided as package cards into the same boxes as those of the PBXs 1, 2. Unique IP addresses are allocated to the IP communication interface devices 5, 6.

In addition to the IP communication interface devices 5, 6, data terminals (not shown) such as PCs each having the data communication function and routers 9, 10 serving as relay (routing) devices, are connected to the LANs 7, 8. The LANs 7, 8 are configured based on a star network topology such as 10BASE-T (in which a trunk line transmission speed is 10 Mpbs, a base band modulation method is adopted, and a transmission medium involves the use of a twisted pair cable) or 100BASE-TX, and may also be configured by using other network topologies such as a bus network.

An Internet 11 as an IP packet switched network (IP network) is connected to the routers 9, 10. This Internet 11 is strictly categorized as the Intranet when the IP packet switched network is an intra-office network, however, there is herein no particular distinction in terminology. Further, the Internet 11 is constructed of a leased line, ISDN LAN and WAN. The IP communication network system can be configured based on this architecture.

[First Example of Architectures and Operations of Private Branch Exchange and IP Communication Interface Device]

(Private Branch Exchange)

Figure 2:
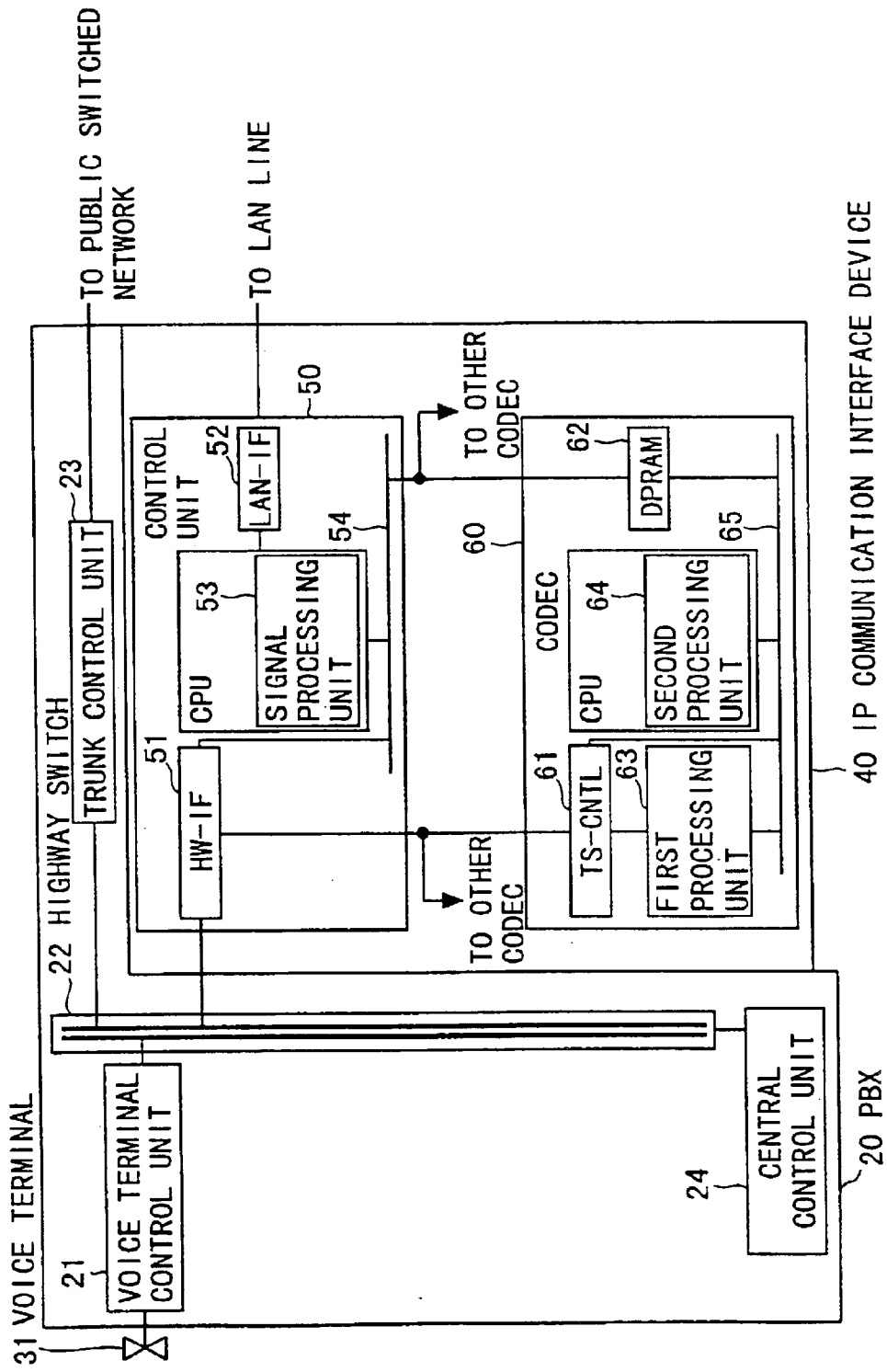
FIG. 2 is an explanatory block diagram showing a first example of a private branch exchange (PBX) and an IP communication interface device and operations thereof.

A first PBX 20 corresponding to the PBXs 1, 2 in IP communication network system shown in FIG. 1, as illustrated in FIG. 2, includes a voice terminal (subscriber) control unit 21, a highway switch 22, a trunk control unit 23 and a central control unit 24.

The voice terminal control unit 21 accommodates a voice terminal (telephone) 31 incorporating a voice communication function through a subscriber line, and is connected to the highway switch 22. The voice terminal control unit 21 controls detection of calling, response and disconnection, controls a receipt of dialing and controls a calling signal with respect to the voice terminal 31. The voice terminal control unit 21 also controls receiving operations when the voice terminal 31 is set on a receiving side.

The highway switch 22 is constructed of a time division multiplexing transmission path (Highway: HW) having [nB+D] (n=1~31) channels, and has a capacity of, e.g., 2 Mbps (64 Kbps×32 time slots TS). The trunk control unit 23 accommodates an ISDN relay line of BRI (Basic Rate Interface, which is a basic interface having a transmission speed of 192 Kbps) or PRI (Primary Rate Interface, which is a primary group speed interface having a transmission speed of 1.544/2.048 Mbps) that is connected to the public switched network. The trunk control unit 23 serves to transmit and receive voice data (Bch data) of a B channel and control data (Dch data) of a D channel. Further, the trunk control unit 23 is connected directly to the highway switch 22.

The central control unit 24 switches the lines by controlling the voice terminal control unit 21, the highway switch 22 and the trunk control unit 23, respectively. Moreover, the central control unit 24 executes setting, canceling and outputting of station data via a maintenance/operation interface (unillustrated).

(IP Communication Interface Device)

Figure 3:
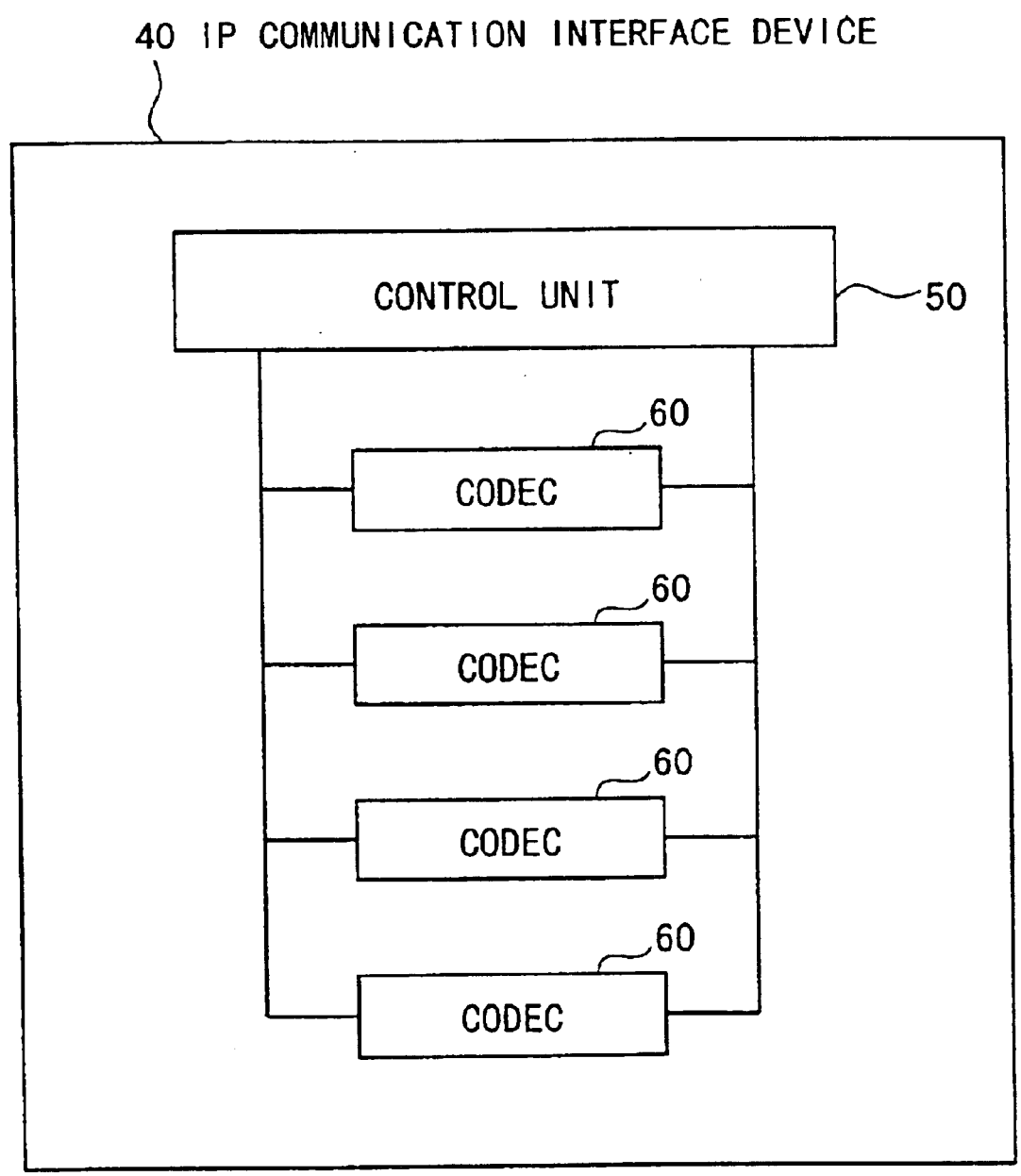
FIG. 3 is a diagram showing a layout of a control unit and CODECs that are mounted as a package card in the IP communication interface device.

Next, a first IP communication interface device 40 corresponding to the IP communication interface devices 5, 6 in the IP communication network system shown in FIG. 1, as illustrated in FIG. 2, includes a control unit 50 and a CODEC 60. The control unit 50 and the CODEC 60 are constructed of an individual or one piece of package card, and this package card is mounted as the IP interface device 40 into the same box as that of the PBX 20 described above. FIG. 3 is a diagram showing a layout of the control unit 50 and the CODECs 60, which are mounted in the single package card.

The control unit 50 comprises a highway switch interface (that will hereinafter be abbreviated to HW-IF in some cases) 51, a LAN interface (that will hereinafter be abbreviated to LAN-IF as the case may be) 52, a signal processing unit 53 provided in a CPU (Central Processing Unit), and an internal bus 54. The control unit 50 transmits and receives packets corresponding to media with an Internet line via a LAN line, which are voice packets in this example. Further, the control unit 50 is connected to the highway switch 22 of the PBX 20 and to the LANs 7, 8, and controls the CODECs 60 to assemble and deassemble the packets of data corresponding to the media, i.e., the voice data in this example.

The HW-IF 51 connected directly to the highway of the highway switch 22 takes line data of 64 Kbps out of this highway (a transmission speed thereof is, e.g., 2 Mbps) and inserts the line data of 64 Kbps into the highway of the highway switch 22. The LAN-IF 52 is connected to the LANs 7, 8 and controls electric/physical interfaces of the LAN lines in the LAN topology, i.e., 10BASE-T or 100BASE-TX in this example. The signal processing unit 53 establishes calls between connection type communications on the side of the switched circuit network of the PBX 20 and connectionless type communications on the side of the Internet, and processes an end call control signal.

Further, the CODEC 60 connected to the control unit 50 is constructed of a dropper/inserter (which hereinafter might be referred to as TS-CNTL) 61, a dual port memory (which hereinafter might be termed DPRAM) 62, a first processing unit 62 composed of a digital signal processor (DSP) and having a coding/decoding function, a second processing unit 64 provided in the CPU and having a packet assembling/deassembling function, and an internal bus 65. The CODEC 60 assembles and deassembles the packet of the data corresponding to the media, i.e., the voice data in this example.

The TS-CONTL 61 takes the data out of a 64 Kbps time slot of an internal transmission path between the control unit 50 and the CODEC 60, and inserts the data into the same time slot. The DPRAM 62 enables the signal processing unit 53 of the control unit 50 and the second processing unit 64 of the CODEC 60 to perform the internal communications therebetween.

The first processing unit 63 executes a process of coding continuous signals of the voice data taken out of the time slot in the TS-CNTL 61 into discrete signals of the voice packet to the Internet line. Further, the first processing unit 63 executes a process of decoding the voice packet forwarded from the Internet line into the continuous signals of the voice data, whereby the decoded signals can be inserted into the predetermined time slot in the TS-CNTL 61.

The second processing unit 64 controls the first processing unit 63, and executes the packet assembly including an addition of RTP (Real Time Transport Protocol) for enabling a real time transport to be carried out and a packet deassembly including an elimination of RTP. Note that the CODECs 60 are extensible corresponding to an increase in the number of output channels to the LANs 7, 8 from the IP communication interface device 40.

The IP communication interface device 40 is connected directly to the highway of the highway switch 22 via the HW-IF 51, and may therefore be treated as a [trunk device] embraced by the ISDN relay line as viewed from the PBX 20.

(Operation)

In the first IP communication interface device 40 taking the architecture described above, the voice data (Bch data) are inputted via the HW-IF 51 of the control unit 50 to the TS-CNTL 61 of the CODEC 60 from the highway switch 22 of the PBX 20.

The voice data inputted to the TS-CNTL 61 are coded in the first processing unit 63 and subjected to a voice compression and a silence compression according to ITU-T G.729 Annex A/B. The coded voice data, which have been thus compressed, are transmitted to the second processing unit 64 via the internal bus 65 from the first processing unit 63. The second processing unit 64 adds RTP to the coded voice data, thereby assembling a voice packet. This voice packet is transferred to the signal processing unit 53 of the control unit 50 via the DPRAM 62 and the internal bus 54 as well.

Figure 4A:
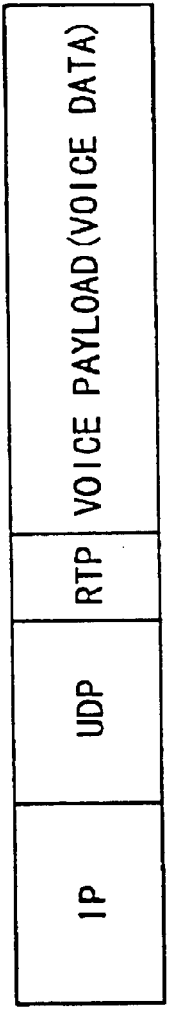
FIGS. 4A to 4D are explanatory diagrams showing a frame structure of a variety of packets transmitted and received between the IP communication interface device and a LAN line (Internet line)

The signal processing unit 53 assembles a voice packet by adding a UDP (User Datagram Protocol) header and an IP (Internet Protocol) header to the former voice packet received from the CODEC 60, and forwards this assembled voice packet to the LAN lines connected to the LANs 7, 8 via the LAN-IF 52. FIG. 4(A) shows a frame structure of the voice packet on the LAN line and the Internet line.

Further, the control data (Dch data) of the call control signal etc corresponding to a TTC Standard JT-Q.931 message, are inputted to the signal processing unit 53 via the HW-IF 51 of the control unit 50 and the internal bus from the highway switch 22 of the PBX 20.

Figure 4B:
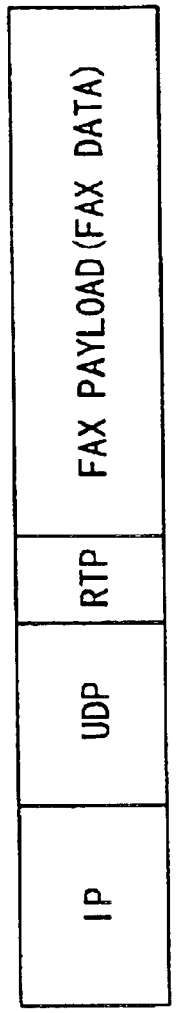
Figure 4C:
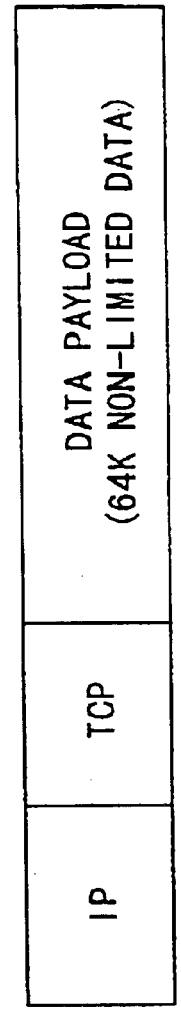
Figure 4D:
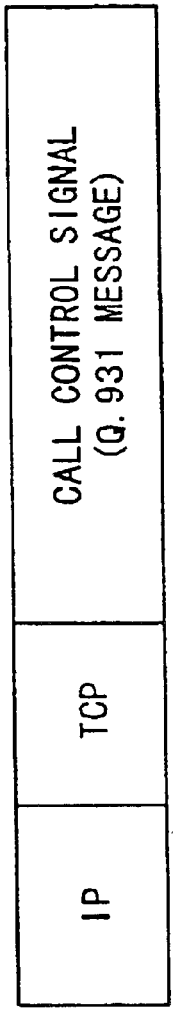

The signal processing unit 53 assembles a control data packet based on a frame structure shown in FIG. 4(D) by adding a TCP (Transmission Control Protocol) header and an IP header to the received control data. This control data packet is forwarded to the LAN lines connected to the LANs 7, 8 via the LAN-IF 52.

On the other hand, when the voice packet is inputted to the IP communication interface device 40 from the LAN line, the voice packet is deassembled and decoded into Bch voice data through processing steps opposite to those described above. The Bch voice data are then transmitted to the highway switch 22 of the PBX 20.

Further, when the control data packet is inputted to the IP communication interface device 40 from the LAN line, the packet is deassembled through processing steps opposite to those explained above into Dch control data, and the Dch control data are transmitted to the highway switch 22 of the PBX 20. Namely, the IP communication interface device 40 transparently transmits and receives the control data between the PBX 20 and the LANs 7, 8.

[Second Example of Architectures and Operations of Private Branch Exchange and IP Communication Interface Device]

(Private Branch Exchange)

Figure 5:
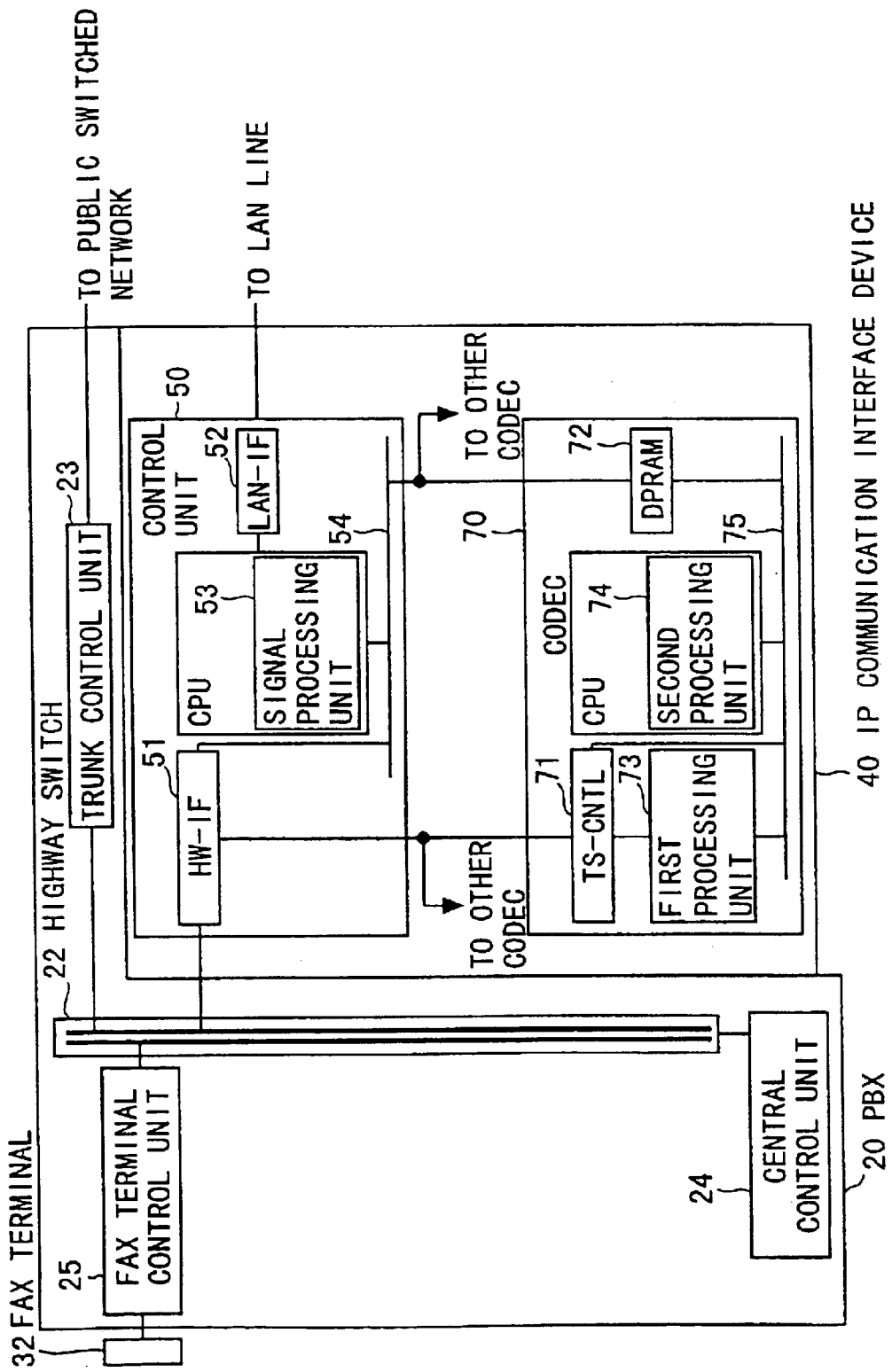
FIG. 5 is an explanatory block diagram showing a second example of the PBX and the IP communication interface device and operations thereof.

A second PBX 20 corresponding to the PBXs 1, 2 in IP communication network system shown in FIG. 1, as illustrated in FIG. 5, includes a facsimile (FAX) terminal control unit 25, the highway switch 22, the trunk control unit 23 and the central control unit 24.

The FAX terminal control unit 25 accommodates a facsimile (FAX) terminal (telephone) 32 incorporating a FAX communication function through a FAX line, and is connected to the highway switch 22. The FAX terminal control unit 25 controls a transmission, a receipt and a disconnection with respect to the FAX terminal 32.

The highway switch 22 is constructed of a time division multiplexing transmission path (Highway: HW) having

[nB+D] (n=1~31) channels, and has a capacity of, e.g., 2 Mbps (64 Kbps×32 time slots TS). The trunk control unit 23 accommodates the ISDN relay line of BRI or PRI that is connected to the public switched network. The trunk control unit 23 serves to transmit and receive FAX data (Bch data) of the B channel and control data (Dch data) of the D channel. Further, the trunk control unit 23 is connected directly to the highway switch 22.

The central control unit 24 switches the lines by controlling the FAX terminal control unit 25, the highway switch 22 and the trunk control unit 23, respectively. Moreover, the central control unit 24 executes setting, canceling and outputting of station data via the maintenance/operation interface (unillustrated).

(IP Communication Interface Device)

Next, a second IP communication interface device 40 corresponding to the IP communication interface devices 5, 6 in the IP communication network system shown in FIG. 1, as illustrated in FIG. 5, includes the control unit 50 and a CODEC 70. The control unit 50 and the CODEC 70 are constructed of an individual or one piece of package card, and this package card is mounted as the IP interface device 40 into the same box as that of the PBX 20 described above. A layout of the control unit 50 and the CODECs 70, which are mounted in the single package card, is the same as that shown in FIG. 3.

The control unit 50 comprises the highway switch interface (HW-IF)51, the LAN interface (LAN-IF)52, the signal processing unit 53 provided in the CPU, and the internal bus 54. The control unit 50 transmits and receives packets corresponding to media with the Internet line via the LAN line, which are FAX packets in this example. Further, the control unit 50 is connected to the highway switch 22 of the PBX 20 and to the LANs 7, 8, and controls the CODECs 70 to assemble and deassemble the packets of data corresponding to the media, i.e., the FAX data in this example.

The HW-IF 51 connected directly to the highway of the highway switch 22 takes line data of 64 Kbps out of this highway (the transmission speed thereof is, e.g., 2 Mbps) and inserts the line data of 64 Kbps into the highway of the highway switch 22. The LAN-IF 52 is connected to the LANs 7, 8 and controls the electric/physical interfaces of the LAN lines in the LAN topology, i.e., 10BASE-T or 100BASE-TX in this example. The signal processing unit 53 establishes calls between the connection type communications on the side of the switched circuit network of the PBX 20 and the connectionless type communications on the side of the Internet, and processes the end call control signal.

Further, the CODEC 70 connected to the control unit 50 is constructed of a dropper/inserter (TS-CNTL) 71, a dual port memory (DPRAM) 72, a first processing unit 73 composed of a digital signal processor (DSP) and having a coding/decoding function, a second processing unit 74 provided in the CPU and having a packet assembling/deassembling function, and an internal bus 75. The CODEC 70 assembles and deassembles the packet of the data corresponding to the media, i.e., the FAX data in this example.

The TS-CONTL 71 takes the data out of a 64 Kbps time slot of an internal transmission path between the control unit 50 and the CODEC 70, and inserts the data into the same time slot. The DPRAM 72 enables the signal processing unit 53 of the control unit 50 and the second processing unit 74 of the CODEC 70 to perform the internal communications therebetween.

The first processing unit 73 executes a process of coding continuous signals of the FAX data taken out of the time slot in the TS-CNTL 71 into discrete signals of the FAX packet to the Internet line. Further, the first processing unit 73 executes a process of decoding the FAX packet forwarded from the Internet line into the continuous signals of the FAX data, whereby the decoded signals can be inserted into the predetermined time slot in the TS-CNTL 71.

The second processing unit 74 controls the first processing unit 73, and executes the packet assembly including the addition of RTP for enabling the real time transport to be carried out and a packet deassembly including the elimination of RTP. Note that the CODECs 70 are extensible corresponding to an increase in the number of output channels to the LANs 7, 8 from the IP communication interface device 40.

The second IP communication interface device 40 is connected directly to the highway of the highway switch 22 via the HW-IF 51, and may therefore be treated as the [trunk device] embraced by the ISDN relay line as viewed from the PBX 20.

Operation

In the second IP communication interface device 40 taking the architecture described above, the FAX data (Bch data) having a transmission speed of G3 are inputted via the HW-IF 51 of the control unit 50 to the TS-CNTL 71 of the CODEC 70 from the highway switch 22 of the PBX 20.

The FAX data inputted to the TS-CNTL 71 are coded based on a FAX relay method of FRP.11 in the first processing unit 73 having automatically detected inter-FAX-terminal signals. The coded FAX data are transmitted to the second processing unit 74 via the internal bus 75 from the first processing unit 73. The second processing unit 74 adds RTP to the coded FAX data, thereby assembling a FAX packet. This FAX packet is transferred to the signal processing unit 53 of the control unit 50 via the DPRAM 72 and the internal bus 54 as well.

The signal processing unit 53 assembles a FAX packet by adding a UDP header and an IP header to the former FAX packet received from the CODEC 70, and forwards this assembled FAX packet to the LAN lines connected to the LANs 7, 8 via the LAN-IF 52. FIG. 4(B) shows a frame structure of the FAX packet on the LAN line and the Internet line.

On the other hand, when the FAX packet is inputted to the IP communication interface device 40 from the LAN line, the FAX packet is deassembled and decoded into Bch FAX data through processing steps opposite to those described above. The Bch FAX data are then transmitted to the highway switch 22 of the PBX 20.

Note that the processes of transmitting and receiving the control data (Dch data) of the call control signal etc corresponding to the TTC Standard JT-Q.931 message in this IP communication interface device 40, are the same as those in the first IP communication interface device 40 described above.

[Third Example of Architectures and Operations of Private Branch Exchange and IP Communication Interface Device]

(Private Branch Exchange)

Figure 6:
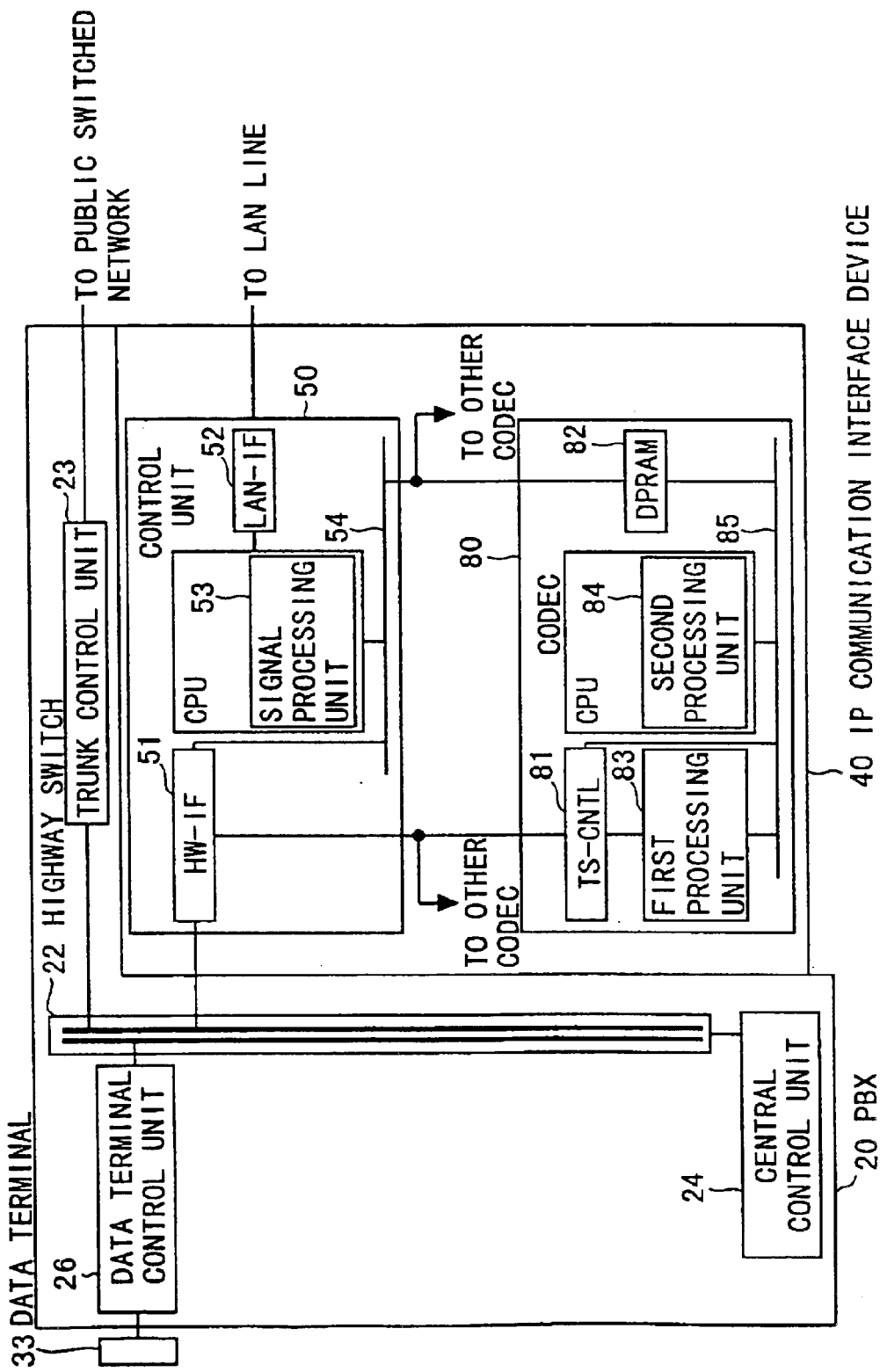
FIG. 6 is an explanatory block diagram showing a third example of the PBX and the IP communication interface device and operations thereof.

A third PBX 20 corresponding to the PBXs 1, 2 in IP communication network system shown in FIG. 1, as illustrated in FIG. 6, includes a data terminal control unit 26, the highway switch 22, the trunk control unit 23 and the central control unit 24.

The data terminal control unit 26 accommodates a data terminal 33 incorporating a data communication function through a data line, and is connected to the highway switch 22. The data terminal control unit 26 controls a transmission and a receipt with respect to the data terminal 33.

The highway switch 22 is constructed of a time division multiplexing transmission path (Highway: HW) having [nB+D] (n=1~31) channels, and has a capacity of, e.g., 2 Mbps (64 Kbps×32 time slots TS). The trunk control unit 23 accommodates the ISDN relay line of BRI or PRI that is connected to the public switched network. The trunk control unit 23 serves to transmit and receive 64 Kbps non-limited digital data (Bch data) of the B channel and control data (Dch data) of the D channel. Further, the trunk control unit 23 is connected directly to the highway switch 22.

The central control unit 24 switches the lines by controlling the data terminal control unit 26, the highway switch 22 and the trunk control unit 23, respectively. Moreover, the central control unit 24 executes setting, canceling and outputting of station data via the maintenance/operation interface (unillustrated).

(IP Communication Interface Device)

Next, a third IP communication interface device 40 corresponding to the IP communication interface devices 5, 6 in the IP communication network system shown in FIG. 1, as illustrated in FIG. 6, includes the control unit 50 and a CODEC 80. The control unit 50 and the CODEC 80 are constructed of an individual or one piece of package card, and this package card is mounted as the IP interface device 40 into the same box as that of the PBX 20 described above. A layout of the control unit 50 and the CODECs 80, which are mounted in the single package card, is the same as that shown in FIG. 3.

The control unit 50 comprises a highway switch interface (HW-IF) 51, a LAN interface (LAN-IF) 52, a signal processing unit 53 provided in the CPU, and an internal bus 54. The control unit 50 transmits and receives packets corresponding to media with the Internet line via the LAN line, which are data packets in this example. Further, the control unit 50 is connected to the highway switch 22 of the PBX 20 and to the LANs 7, 8, and controls the CODECs 80 to assemble and deassemble the packets of data corresponding to the media in this example.

The HW-IF 51 connected directly to the highway of the highway switch 22 takes line data of 64 Kbps out of this highway (a transmission speed thereof is, e.g., 2 Mbps) and inserts the line data of 64 Kbps into the highway of the highway switch 22. The LAN-IF 52 is connected to the LANs 7, 8 and controls the electric/physical interfaces of the LAN lines in the LAN topology, i.e., 10BASE-T or 100BASE-TX in this example. The signal processing unit 53 establishes calls between the connection type communications on the side of the switched circuit network of the PBX 20 and the connectionless type communications on the side of the Internet, and processes the end call control signal.

Further, the CODEC 80 connected to the control unit 50 is constructed of a dropper/inserter (TS-CNTL) 81, a dual port memory (DPRAM) 82, a first processing unit 83 composed of a digital signal processor (DSP) and having a coding/decoding function, a second processing unit 84 provided in the CPU and having a packet assembling/deassembling function, and an internal bus 85. The CODEC 80 assembles and deassembles the packet of the data corresponding to the media in this example.

The TS-CONTL 81 takes the data out of a 64 Kbps time slot of an internal transmission path between the control unit 50 and the CODEC 80, and inserts the data into the same time slot. The DPRAM 82 enables the signal processing unit 53 of the control unit 50 and the second processing unit 84, which will be explained later on, of the CODEC 80 to perform the internal communications therebetween.

The first processing unit 83 executes a process of coding continuous signals of the data taken out of the time slot in the TS-CNTL 81 into discrete signals of the data packet to the Internet line. Further, the first processing unit 83 executes a process of decoding the data packet forwarded from the Internet line into the continuous signals of the data, whereby the decoded signals can be inserted into the predetermined time slot in the TS-CNTL 81. Note that the first processing unit 83 neither compresses nor extends the data, and, instead, there may be taken a process of merely letting the data through.

The second processing unit 84 controls the first processing unit 83, and assembles and deassembles the packets. Note that the CODECs 80 are extensible corresponding to an increase in the number of output channels to the LANs 7, 8 from the IP communication interface device 40.

The third IP communication interface device 40 described above is connected directly to the highway of the highway switch 22 via the HW-IF 51, and may therefore be treated as a [trunk device] embraced by the ISDN relay line as viewed from the PBX 20.

(Operation)

In the third IP communication interface device 40 taking the architecture described above, the 64 Kbps non-limited digital data (Bch data) excluding the FAX data having the transmission speed of G3 are inputted via the HW-IF 51 of the control unit 50 to the TS-CNTL 81 of the CODEC 80 from the highway switch 22 of the PBX 20.

The data inputted to the TS-CNTL 81 are coded in the first processing unit 83. The coded data are transmitted to the second processing unit 84 via the internal bus 85 from the first processing unit 83. The second processing unit 84, based on the coded data, assembles a data packet. This data packet is transferred to the signal processing unit 53 of the control unit 50 via the DPRAM 82 and the internal bus 54 as well.

The signal processing unit 53 assembles a data packet by adding a TCP header and an IP header to the former data packet received from the CODEC 80, and forwards this assembled data packet to the LAN lines connected to the LANs 7, 8 via the LAN-IF 52. FIG. 4(C) shows a frame structure of the data packet on the LAN line and the Internet line.

On the other hand, when the data packet is inputted to the IP communication interface device 40 from the LAN line, the data packet is deassembled and decoded into Bch data through processing steps opposite to those described above. The Bch data are then transmitted to the highway switch 22 of the PBX 20.

Note that the processes of transmitting and receiving the control data (Dch data) of the call control signal etc corresponding to the TTC Standard JT-Q.931 message in this IP communication interface device 40, are the same as those in the first IP communication interface device 40 described above.

[Fourth Example of Architectures and Operations of Private Branch Exchange and IP Communication Interface Device]

(Private Branch Exchange)

Figure 7:
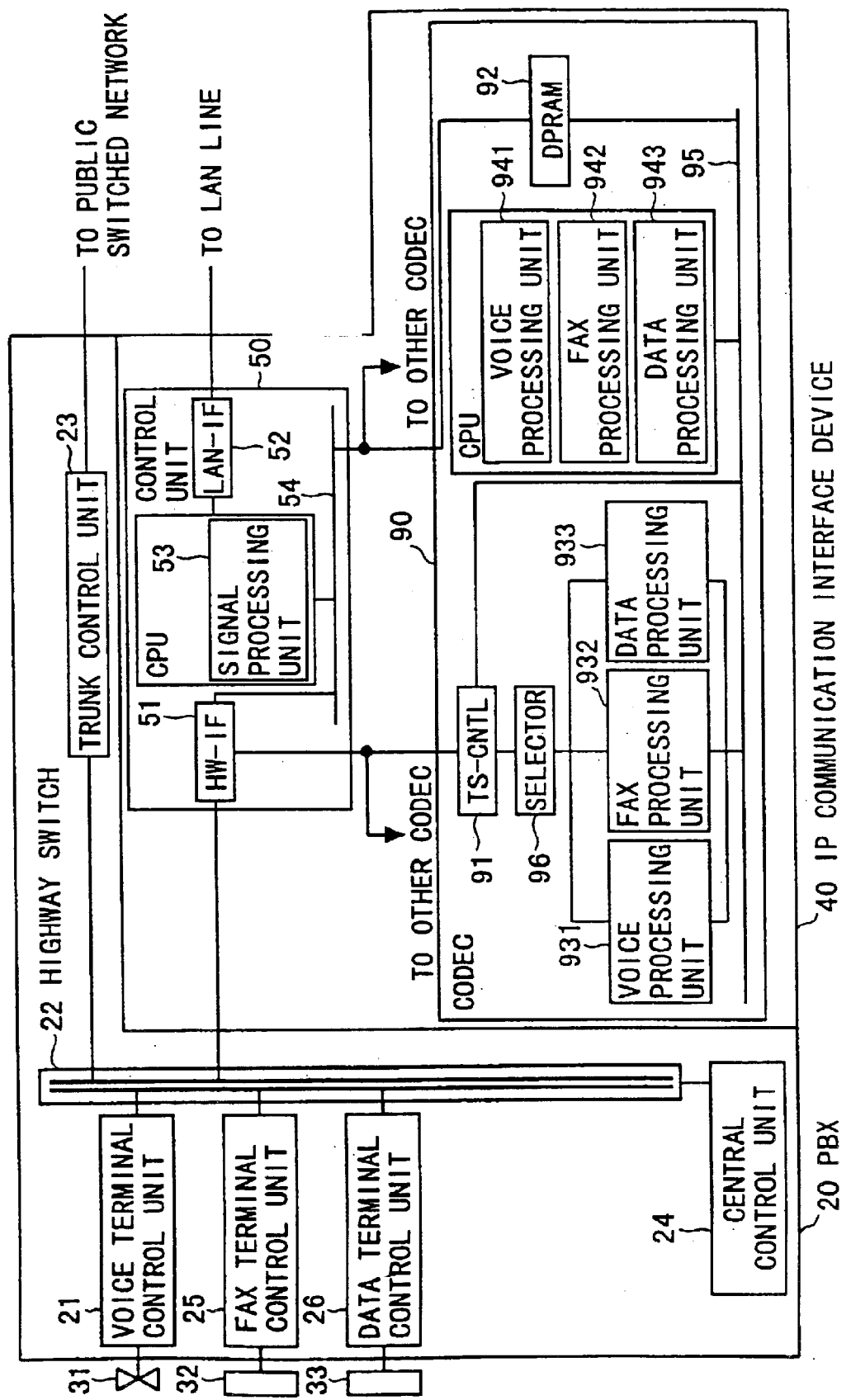
FIG. 7 is an explanatory block diagram showing a fourth example of the PBX and the IP communication interface device and operations thereof.

A fourth PBX 20 corresponding to the PBXs 1, 2 in IP communication network system shown in FIG. 1, as illustrated in FIG. 7, includes the voice terminal (subscriber)

control unit 21, the facsimile (FAX) terminal control unit 25, the highway switch 22, the trunk control unit 23 and the central control unit 24.

The voice terminal control unit 21 accommodates a voice terminal (telephone) 31 corresponding to the communication terminal devices 3, 4 and incorporating a voice communication function through a subscriber line, and is connected to the highway switch 22. The voice terminal control unit 21 controls detection of calling, response and disconnection, controls a receipt of dialing and controls a calling signal with respect to the voice terminal 31. The voice terminal control unit 21 also controls receiving operations when the voice terminal 31 is set on a receiving side.

The FAX terminal control unit 25 accommodates a facsimile (FAX) terminal 32 corresponding to the communication terminal devices 3, 4 and incorporating a FAX communication function through a FAX line, and is connected to the highway switch 22. The FAX terminal control unit 25 controls a transmission, a receipt and a disconnection with respect to the FAX terminal 32.

The data terminal control unit 26 accommodates a data terminal 33 such as a PC corresponding to the communication terminal devices 3, 4 and incorporating a data communication function through a data line, and is connected to the highway switch 22. The data terminal control unit 26 controls a transmission and a receipt with respect to the data terminal 33.

The highway switch 22 is constructed of a time division multiplexing transmission path (Highway: HW) having [nB+D] (n=1~31) channels, and has a capacity of, e.g., 2 Mbps (64 Kbps×32 time slots TS). The trunk control unit 23 accommodates the ISDN relay line of BRI or PRI that is connected to the public switched network. The trunk control unit 23 serves to transmit and receive the voice data, the FAX data or the data (Bch data) of the B channel and control data (Dch data) of the D channel. Further, the trunk control unit 23 is connected directly to the highway switch 22.

The central control unit 24 switches the lines by controlling the voice terminal control unit 21, the FAX terminal control unit 25, the data terminal control unit 26, the highway switch 22 and the trunk control unit 23, respectively. Moreover, the central control unit 24 executes setting, canceling and outputting of station data via the maintenance/operation interface (unillustrated).

(IP Communication Interface Device)

Next, a fourth IP communication interface device 40 corresponding to the IP communication interface devices 5, 6 in the IP communication network system shown in FIG. 1, as illustrated in FIG. 7, includes the control unit 50 and a CODEC 90. The control unit 50 and the CODEC 90 are constructed of an individual or one piece of package card, and this package card is mounted as the IP interface device 40 into the same box as that of the PBX 20 described above. A layout of the control unit 50 and the CODECs 90, which are mounted in the single package card, is the same as that shown in FIG. 3.

The control unit 50 comprises the highway switch interface (HW-IF) 51, the LAN interface (LAN-IF) 52, the signal processing unit 53 provided in the CPU, and the internal bus 54. The control unit 50 transmits and receives packets corresponding to media with the Internet line via the LAN line, which are the voice packets, the FAX packets or the data packets. Further, the control unit 50 is connected to the highway switch 22 of the PBX 20 and to the LANs 7,8, and controls the CODECs 90 to assemble and deassemble the packets of data corresponding to the media.

The HW-IF 51 connected directly to the highway of the highway switch 22 takes line data of 64 Kbps out of this highway (the transmission speed thereof is, e.g., 2 Mbps) and inserts the line data of 64 Kbps into the highway of the highway switch 22. The LAN-IF 52 is connected to the LANs 7, 8 and controls the electric/physical interfaces of the LAN lines in the LAN topology, i.e., 10BASE-T or 100BASE-TX in this example. The signal processing unit 53 establishes calls between the connection type communications on the side of the switched circuit network of the PBX 20 and the connectionless type communications on the side of the Internet, and processes the end call control signal.

Further, the CODEC 90 connected to the control unit 50 is constructed of a dropper/inserter (TS-CNTL) 91, a dual port memory (DPRAM) 92, a first voice processing unit 931, a first FAX processing unit 932 and a first data processing unit 933 each composed of a digital signal processor (DSP) and having a coding/decoding function, a second voice processing unit 941, a second FAX processing unit 942 and a second data processing unit 943 each provided in the CPU and having a packet assembling/deassembling function, an internal bus 95 and a selector 96. The CODEC 90 assembles and deassembles the packet of the data corresponding to the media.

The TS-CONTL 91 takes the data out of a 64 Kbps time slot of an internal transmission path between the control unit 50 and the CODEC 90, and inserts the data into the same time slot. The DPRAM 92 enables the signal processing unit 53 of the control unit 50 and the second processing units 941, 942, 943 of the CODEC 90 to perform the internal communications therebetween.

The first voice processing unit 931 executes a process of coding continuous signals of the voice data taken out of the time slot in the TS-CNTL 91 into discrete signals of the voice packet to the Internet line. Further, the first voice processing unit 931 executes a process of decoding the voice packet forwarded from the Internet line into the continuous signals of the voice data, whereby the decoded signals can be inserted into the predetermined time slot in the TS-CNTL 91.

The first FAX processing unit 932 executes a process of coding continuous signals of the FAX data taken out of the time slot in the TS-CNTL 91 into discrete signals of the FAX packet to the Internet line. Further, the first FAX processing unit 932 executes a process of decoding the FAX packet forwarded from the Internet line into the continuous signals of the FAX data, whereby the decoded signals can be inserted into the predetermined time slot in the TS-CNTL 91.

The first data processing unit 933 executes a process of coding continuous signals of the data taken out of the time slot in the TS-CNTL 91 into discrete signals of the data packet to the Internet line. Further, the first data processing unit 933 executes a process of decoding the data packet forwarded from the Internet line into the continuous signals of the data, whereby the decoded signals can be inserted into the predetermined time slot in the TS-CNTL 91. Note that the first data processing unit 933 neither encodes nor decodes the data, and, instead, there may be taken a process of merely letting the data through.

The second voice processing unit 941 and the second FAX processing unit 942 control the first voice processing unit 93a and the first FAX processing unit 932 corresponding thereto, and executes the packet assembly including the addition of RTP for enabling the real time transport to be carried out and a packet deassembly including the elimination of RTP.

The second data processing unit 943 controls the first data processing unit 933, and executes the packet assembly and the packet deassembly.

The selector 96 receives a switching signal from the signal processing unit 53, and selects the first voice processing unit 931 or the first FAX processing unit 932 or the first data processing unit 933 in accordance with a content of this switching signal, i.e., the media specified. Note that the CODECs 90 are extensible corresponding to an increase in the number of output channels to the LANs 7, 8 from the IP communication interface device 40.

The fourth IP communication interface device 40 is connected directly to the highway of the highway switch 22 via the HW-IF 51, and may therefore be treated as the [trunk device] embraced by the ISDN relay line as viewed from the PBX 20.

(Operation)

In the fourth IP communication interface device 40 taking the architecture described above, the voice data, the FAX data having the transmission speed of G3, or the 64 Kbps non-limited digital data are inputted as the Bch data via the HW-IF 51 of the control unit 50 to the TS-CNTL 91 of the CODEC 90 from the highway switch 22 of the PBX 20.

The signal processing unit 53 of the control unit 50 distinguishes between items of media data corresponding to the voice data, the FAX data and the data inputted from the highway switch 22 of the PBX 20 via the HW-IF 51, and transmits a switching signal to the selector 96.

The selector 96 receives the switching signal from the signal processing unit 53, and selects the first voice processing unit 931, or the first FAX processing unit 932 or the first data processing unit 933 in accordance with a content of this switching signal, i.e., the media specified.

To describe it in greater details, the signal processing unit 53 of the control unit 50, when detecting a Dch signal in which a transmission capability data element as the media data is non-limited digital, transmits the switching signal to the selector 96 via the HW-IF 51 and TS-CNTL 91. The selector 96 receiving the switching signal from the signal processing unit 53, selects the first data processing unit 933 in accordance with the media specified. Further, the signal processing unit 53 of the control unit 50, when detecting a Dch signal in which the transmission capability data element as the media data is not non-limited digital, transmits the switching signal to the selector 96 on the same route. Then, the selector 96 selects the first voice processing unit 931. This process is the same irrespective of whether the IP communication interface device 40 is set on the transmitting side or on the receiving side.

The signal processing unit 53, when detecting a NSF (Non Standard Facilities) or DIS (Digital Identification Signal) given from the FAX terminal 32 accommodated in the PBX 20, identifies that the terminal is the FAX terminal 32 on the receiving side, and transmits the switching signal to the selector 96 on the same route as the above. Then, the selector 96 selects the first FAX processing unit 932. At this time, the signal processing unit 53 transmits a [switching] Dch signal to the transmission-sided IP communication interface device 40 on the opposite side via the LAN line.

Further, the signal processing unit 53, when detecting a normal end of the FAX procedure or a time-out of the switchover to FAX or a DCN (Disconnect) signal, transmits the switching signal to the selector 96. Then, the selector 96 selects the first voice processing unit 931 from the first FAX processing unit 932. Subsequently, the signal processing unit 53 transmits the [switching] Dch signal to the transmission-sided IP communication interface device 40 on the opposite side via the LAN line.

The signal processing unit 53, when receiving the [switching] Dch signal transmitted from the IP communication interface device 40 on the opposite side, transmits the switching signal to the selector 96, whereby the selector 96 selects the first FAX processing unit 932.

The voice data inputted to the TS-CNTL 91 are coded in the first voice processing unit 931 through the selector 96 and subjected to the voice compression and the silence compression based on the ITU-T G.729 Annex A/B. The coded voice data, which have been thus compressed, are transmitted to the second processing unit 941 via the internal bus 95 from the first voice processing unit 931. The second voice processing unit 6941 adds RTP to the coded voice data, thereby assembling a voice packet. This voice packet is transferred to the signal processing unit 53 of the control unit 50 via the DPRAM 92 and the internal bus 54 as well.

The signal processing unit 53 assembles the voice packet by adding a UDP header and an IP header to the former voice packet received from the CODEC 90, and forwards this assembled voice packet to the LAN lines connected to the LANs 7, 8 via the LAN-IF 52. The frame structure of the voice packet on the LAN line and the Internet line is as shown in FIG. 4(A).

On the other hand, when the voice packet is inputted to the IP communication interface device 40 from the LAN line, the voice packet is deassembled and decoded into Bch voice data through processing steps opposite to those described above. The Bch voice data are then transmitted to the highway switch 22 of the PBX 20.

The FAX data inputted to the TS-CNTL 91 are coded based on the FAX relay method of FRP.11 in the first FAX processing unit 932 having automatically detected inter-FAX-terminal signals through the selector 96. The coded FAX data are transmitted to the second FAX processing unit 942 via the internal bus 95 from the first FAX processing unit 932. The second FAX processing unit 942 adds RTP to the coded FAX data, thereby assembling a FAX packet. This FAX packet is transferred to the signal processing unit 53 of the control unit 50 via the DPRAM 92 and the internal bus 54 as well.

The signal processing unit 53 assembles a FAX packet by adding a UDP header and an IP header to the former FAX packet received from the CODEC 90, and forwards this assembled FAX packet to the LAN lines connected to the LANs 7, 8 via the LAN-IF 52. The frame structure of the FAX packet on the LAN line and the Internet line is as shown in FIG. 4(B).

On the other hand, when the FAX packet is inputted to the IP communication interface device 40 from the LAN line, the FAX packet is deassembled and decoded into Bch FAX data through processing steps opposite to those described above. The Bch FAX data are then transmitted to the highway switch 22 of the PBX 20.

The data inputted to the TS-CNTL 91 are coded as the necessity may arise in the first data processing unit 933 through the selector 96. The coded data are transmitted to the second data processing unit 943 via the internal bus 95 from the first data processing unit 933. The second data processing unit 943 assembles a data packet on the basis of the coded data. This data packet is transferred to the signal processing unit 53 of the control unit 50 via the DPRAM 92 and the internal bus 54 as well.

The signal processing unit 53 assembles a data packet by adding a TCP header and an IP header to the former data packet received from the CODEC 90, and forwards this assembled data packet to the LAN lines connected to the LANs 7, 8 via the LAN-IF 52. The frame structure of the data packet on the LAN line and the Internet line is as shown in FIG. 4(C).

On the other hand, when the data packet is inputted to the IP communication interface device 40 from the LAN line, the data packet is deassembled and decoded into Bch data through processing steps opposite to those described above. The Bch data are then transmitted to the highway switch 22 of the PBX 20.

Note that the process of transmitting and receiving the control data (Dch data) of the call control signals which correspond to the TTC Standard JT-Q.931 message in this IP communication interface device 40, is the same as that in the first IP communication interface device 40 described above.

The function of the fourth IP communication interface device 40 explained above will be described more specifically. The function that will hereinafter be explained is the same as that of each of the first, second and third IP communication interface devices 40.

The signal processing unit 53 of the control unit 50 extracts a forwarding target number, i.e., an office number and an extension number out of received number data elements of the call control signals (Q.931 message) serving as the Dch control data from the PBX 20, then determines an IP address of a destination (addressee) of the connection on the basis of the office number, and executes address mapping. Subsequently, the signal processing unit 53 sets the determined IP address in the IP header, and transmits the voice packet or the FAX packet or the data packet to the LAN line via the LAN-IF 52. On the other hand, the signal processing unit 53 of the control unit 50, when receiving the voice packet or the FAX packet or the data packet from the LAN line via the LAN-IF 5, extracts only the received number data elements of the call control signal, viz., executes a receiving process without performing the address mapping unlike the transmitting process.

Further, with respect to the Internet 11 in which the routers 9, 10 capable of controlling the priority of the voice packets are disposed, the signal processing unit 53 of the control unit 50, indicates the routers 9, 10 to set the priority by use of TOS (Type of Service) fields of the IP headers, and restrains a delay of forwarding the voice packets.

The second voice processing unit 943 of the CODEC 90 rearranges a sequence of regeneration within a range of the accumulated voice packet data. Namely, the second voice processing unit 943, if a transmission sequence of the voice data arrived is smaller than a transmission sequence of the accumulated voice packet data, regenerates the voice data by decoding in the smaller transmission sequence.

A PB (Push Button) signal received in in-channel band from the PBX 20 is temporarily received and encoded in the CODEC 90, and the signal processing unit 53 of the control unit 50 converts it into a call control signal (Q.931 message) and transmits the call control signal to the LAN line. When the PB signals are inputted in the form of control data from the LAN line via the Internet line, the control unit 50 indicates the first voice processing unit 931 of the CODEC 90 to convert these signals into analog PB signals. The decoded PB signals are transmitted to the PBX 20 via the TS-CNTL 91 and the HW-IF 51 from the first voice processing unit 931.

Software of the CPU of the control unit 50 provided with the signal processing unit 53 and software of the CPU of the CODEC 90 provided with the second processing units 941, 942, 943, can be downloaded from outside via LAN ports based on TCP/IP (10BASE-T or 100BASE-TX).

Further, it is feasible to obtain statistic data, fault data and traced at a from outside via the LAN ports based on TCP/IP (10BASE-T or 100BASE-TX). Namely, in the IP communication interface device 40, various items of statistic data such as the number of transmitted/received packets and a line activity ratio are collected and accumulated in order to grasp an operation state and actualize an effective utilization of the line. Further, the data about faults occurred during the operation are collected and accumulated as a log. The Dch data of the call control signals are collected and accumulated as the trace data for monitoring the transmitted/received data.

Although only a few embodiments of the present invention have been described in detail above, those skilled in the art will readily appreciate that many modifications are possible in the preferred embodiments without departing from the novel teachings and advantages of this invention. Accordingly, all such modifications are intended to be included within the scope of the present invention as defined by the following claims.

What is claimed is:

1. An IP communication interface device comprising:

first and second connecting units for making it possible to dispose between a circuit switched network and LAN connected to an IP packet switched network;

a first processing unit for coding first media-corresponding data as B-channel data inputted to said first connecting unit from said circuit switched network, decoding packet-disassembled media-corresponding data into which a packet of second media-corresponding data inputted to said second connecting unit from said LAN is disassembled, and for transmitting the decoded media-corresponding data to said first connecting unit for forwarding the same data as the first media-corresponding data to said circuit switched network;

a second processing unit for assembling the coded media-corresponding data coded by said first processing unit into a packet, disassembling the packet of the second media-corresponding data, and transmitting the same data as packet-disassembled media-corresponding data to said first processing unit; and a third processing unit for generating the second media-corresponding data by adding predetermined header data to packet-assembled media-corresponding data assembled into a packet by said second processing unit, forwarding the second media-corresponding data to said LAN via said second connecting unit, removing the header data added to the second media-corresponding data inputted to said second connecting unit, and transmitting the second media-corresponding data with the header data removed to said second processing unit, wherein the first and second media-corresponding data include voice data transmitted from voice terminal having a voice communication function, facsimile data transmitted from a facsimile terminal having a facsimile communication function and data transmitted from a data terminal having a data communication function.

2. An IP communication interface device according to claim 1, wherein said first and second processing units are functionally divided corresponding to the voice data, the facsimile data and the data that correspond to the first and second media-corresponding data, and said IP communication interface device further comprises a selecting unit for selecting said first functionally divided processing unit in accordance with a command given from said third processing unit.

3. An IP communication interface device according to claim 1, wherein said second processing unit, for the first media-corresponding data including the voice data and the facsimile data, generates packet-assembled media-corresponding data to which an RTP for enabling a real time transport to be done is added.

4. An IP communication interface device according to claim 3, wherein said second processing unit, for the second media-corresponding data including the voice data and the facsimile data, generates packet-disassembled media-corresponding data from which the RTP for enabling the real time transport to be done is removed.

5. An IP communication interface device according to claim 1, wherein said third processing unit, for packet-assembled media-corresponding data generated by said second processing unit including the voice data and the facsimile data, adds up a UDP header and an IP header as the header data, and, when the packet-assembled media-corresponding data are the essential data, adds a TCP header and an IP header as the header data.

6. An IP communication interface device according to claim 5, wherein said third processing unit, for the second media-corresponding data including the voice data and the facsimile data, removes the UDP header and the IP header are added as the header data, and, for the second media-corresponding data including the essential data, removes the TCP header and the IP header added as the header data.

7. An IP communication interface device according to claim 1, wherein said third processing unit identifies a call control signal as D-channel data in accordance with a message based on a specified protocol, and penetratingly transmits and receives the call control signal simply by adding and removing the TCP header and the IP header.

8. An IP communication interface device according to claim 1, wherein said first and second connecting units and said first, second and third processing units are mounted in a package card.

9. A circuit switch comprising:
a highway switch accommodating at least one of a voice terminal having a voice communication function, a facsimile terminal having a facsimile function and a data terminal having a data communication function, and including a time division multiplexing transmission path for transmitting data corresponding to media;
a first connecting unit connected directly to said highway switch;
a second connecting unit for accommodating a LAN line connected to an IP packet switched network;
a first processing unit for coding first media-corresponding data as B-channel data inputted to said first connecting unit, decoding packet-disassembled media-corresponding data into which a packet of second media-corresponding data inputted to said second connecting unit is disassembled, and transmitting the decoded media-corresponding data to said first connecting unit in order to forward the same decoded media-corresponding data as the first media-corresponding data to said highway switch;
a second processing unit for assembling the coded media-corresponding data coded by said first processing unit, disassembling the packet of the second media-corresponding data, and transmitting the second media-corresponding data as the packet-disassembled media-corresponding data to said first processing unit; and
a third processing unit for generating the second media-corresponding data by adding predetermined header data to packet-assembled media-corresponding data assembled into a packet by said second processing unit, forwarding the second media-corresponding data to said LAN via said second connecting unit, removing the header data added to the second media-corresponding data inputted to said second connecting unit, and transmitting the second media-corresponding data with the header data removed to said second processing unit,
wherein the first and second media-corresponding data include voice data transmitted from the voice terminal having the voice communication function, facsimile data transmitted from the facsimile terminal having the facsimile communication function and data transmitted from the data terminal having the data communication function.

10. A circuit switch according to claim 9, wherein said first and second processing units are functionally divided corresponding to the voice data, the facsimile data and the data that correspond to the first and second media-corresponding data, and said IP communication interface device further including a selecting unit for selecting said first functionally divided processing unit in accordance with a command given from said third processing unit.

11. A circuit switch according to claim 9, wherein said second processing unit, for the first media-corresponding data including the voice data and the facsimile data, generates packet-assembled media-corresponding data to which an RTP for enabling a real time transport to be done is added.

12. A circuit switch according to claim 11, wherein said second processing unit, for the second media-corresponding data including the voice data and the facsimile data, generates packet-disassembled media-corresponding data from which the RTP for enabling the real time transport to be done is removed.

13. A circuit switch according to claim 9, wherein said third processing unit, for the packet-assembled media-corresponding data generated by said second processing unit including the voice data and the facsimile data, adds a UDP header and an IP header as the header data, and, when the packet-assembled media-corresponding data are the essential data, adds a TCP header and an IP header as the header data.

14. A circuit switch according to claim 13, wherein said third processing unit, for the second media-corresponding data including the voice data and the facsimile data, removes the UDP header and the IP header added as the header data, and, for the second media-corresponding data including the essential data, removes the TCP header and the IP header added as the header data.

15. A circuit switch according to claim 9, wherein said third processing unit identifies a call control signal as D-channel data in accordance with a message based on a specified protocol, and penetratingly transmits and receives the call control signal simply by adding and removing the TCP header and the IP header.

16. A circuit switch according to claim 9, wherein said first and second connecting units and said first, second, and third processing units are mounted in a package card.

17. An IP communication network system including a circuit switch comprising:
a highway switch accommodating at least one of a voice terminal having a voice communication function, a facsimile terminal having a facsimile function and a data terminal having a data communication function, and including a time division multiplexing transmission path for transmitting data corresponding to media;

a first connecting unit connected directly to said highway switch;

a second connecting unit for accommodating a LAN line connected to an IP packet switched network;

a first processing unit for coding first media-corresponding data as B-channel data inputted to said first-connecting unit, decoding packet-disassembled media-corresponding data into which a packet of second media-corresponding data inputted to said second connecting unit is disassembled, and transmitting the decoded media-corresponding data to said first connecting unit in order to forward the same decoded media-corresponding data as the first media-corresponding data to said highway switch;

a second processing unit for assembling the coded media-corresponding data coded by said first processing unit, disassembling the packet of the second media-corresponding data, and transmitting the second media-corresponding data as the packet-disassembled media-corresponding data to said first processing unit; and a third processing unit for generating the second media-corresponding data by adding predetermined header data to packet-assembled media-corresponding data assembled into a packet by said processing unit, forwarding the second media-corresponding data to said LAN via said second connecting unit, removing the header data added to the second media-corresponding data inputted to said second connecting unit, and transmitting the second media-corresponding data with the header data removed to said second processing unit;

wherein the first and second media-corresponding data include the voice data transmitted from the voice terminal having the voice communication function, the facsimile data transmitted from the facsimile terminal having the facsimile communication function and the data transmitted from the data terminal having the data communication function.

18. An IP communication network system including an IP communication interface device comprising:

first and second connecting units for making it possible to dispose between a circuit switched network and LAN connected to an IP packet switched network;

a first processing unit for coding first media-corresponding data as B-channel data inputted to said first connecting unit from said circuit switched network, decoding packet-disassembled media-corresponding data into which a packet of second media-corresponding data inputted to said second connecting unit from said LAN is disassembled, and for transmitting the decoded media-corresponding data to said first connecting unit for forwarding the same data as the first media-corresponding data to said circuit switched network;

a second processing unit for assembling the coded media-corresponding data coded by said first processing unit into a packet, disassembled the packet of the second media-corresponding data, and transmitting the same data as packet-disassembled media-corresponding data to said first processing unit; and a third processing unit for generating the second media-corresponding data by adding predetermined header data to packet-assembled media-corresponding data assembled into a packet by said second processing unit, forwarding the second media-corresponding data to said LAN via second connecting unit, removing the header data added to the second media-corresponding data inputted to said second connecting unit, and transmitting the second media-corresponding data with the header data removed to said second processing unit, wherein the first and second media-corresponding data include voice data transmitted from a voice terminal having a voice communication function, facsimile data transmitted from a facsimile terminal having a facsimile communication function and data transmitted from a data terminal having a data communication function.

* * * * *